(12) United States Patent
Felix et al.

(10) Patent No.: US 7,637,526 B2
(45) Date of Patent: Dec. 29, 2009

(54) SLIDING COATING FOR WINTER SPORTS EQUIPMENT

(76) Inventors: Florian Felix, Drosselstrasse 15, Garmisch-Partenkirchen (DE) D-82467; Xaver Hoffmann, Drosselstrass 15, Garmisch-Partenkirchen (DE) D-82467

( * ) Notice: Subject to any disclaimer, the term of this patent is extended or adjusted under 35 U.S.C. 154(b) by 473 days.

(21) Appl. No.: 10/544,544

(22) PCT Filed: Feb. 5, 2004

(86) PCT No.: PCT/EP2004/001078

§ 371 (c)(1), (2), (4) Date: Sep. 9, 2005

(87) PCT Pub. No.: WO2004/069352

PCT Pub. Date: Aug. 19, 2004

(65) Prior Publication Data

US 2006/0151974 A1     Jul. 13, 2006

(30) Foreign Application Priority Data

Feb. 7, 2003    (DE) ................ 103 05 088

(51) Int. Cl.
*A63C 5/00* (2006.01)

(52) U.S. Cl. .................. 280/610; 525/240; 525/323; 280/14.21

(58) Field of Classification Search ............... 280/610, 280/14.21; 525/240, 323
See application file for complete search history.

(56) References Cited

U.S. PATENT DOCUMENTS

| | | | | |
|---|---|---|---|---|
| 4,340,641 | A | * | 7/1982 | Weiner ..................... 428/349 |
| 5,069,976 | A | | 12/1991 | Vuachet et al. ........... 428/474.4 |
| 6,312,828 | B1 | * | 11/2001 | Akao .......................... 428/516 |
| 7,119,155 | B2 | * | 10/2006 | Chow et al. ................. 526/172 |

FOREIGN PATENT DOCUMENTS

| | | |
|---|---|---|
| EP | 0 461 966 | 12/1991 |
| FR | 2 261 790 | 9/1975 |
| FR | 2 697 440 | 5/1994 |

\* cited by examiner

*Primary Examiner*—Robert D. Harlan
(74) *Attorney, Agent, or Firm*—Chalin A. Smith; Smith Patent Consulting

(57) ABSTRACT

According to the invention, a sliding coating for winter sports equipment which is a blend of a copolymer (I) and a copolymer (II) is provided, the copolymer (I) being a propylene copolymer which contains at least 50% of structural building blocks which originate from propylene monomers, and the copolymer (II) being an ethylene copolymer which has at least 50% of structural building blocks which originate from ethylene monomers.

17 Claims, 4 Drawing Sheets

SLIDING COATING FOR WINTER SPORTS EQUIPMENT

Figure 1:
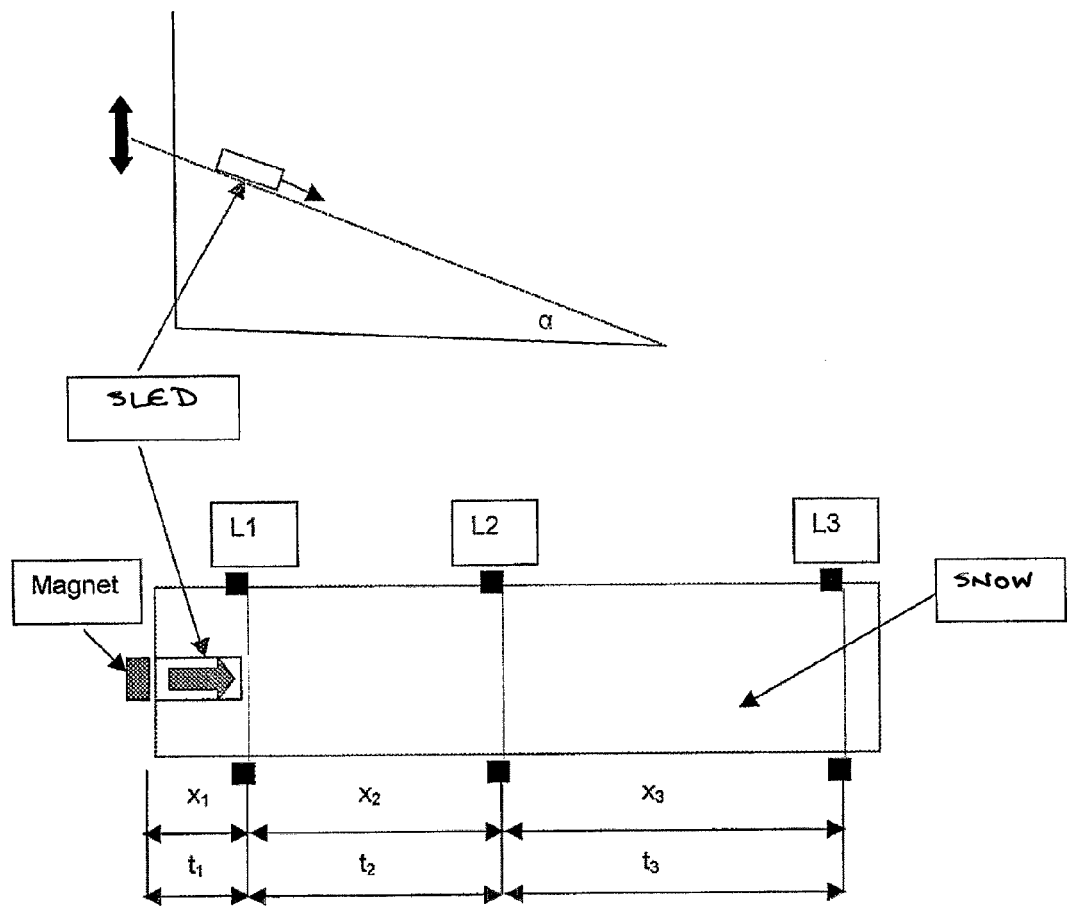

This application claims priority to German Patent Application No. 103 05 088.4 filed Feb. 7, 2003, the contents of which are incorporated by reference herein in its entirety.

The invention relates to a sliding coating for winter sports equipment, in particular for skis and snowboards. The sliding coating may be extruded from a polymer material in a simple manner. The invention furthermore relates to the winter sports equipment coated with the sliding coating.

The quality of winter sports equipment intended for sliding, for example on snow, in particular of skis and of snowboards, is determined to a large extent by their sliding properties. Such winter sports equipment therefore has as a rule a sliding coating which is intended to improve the sliding properties of the equipment on snow. Such a sliding coating substantially comprises a sheet which is adhesively bonded to the skis or the snowboards with the aid of suitable adhesives. Such a sliding coating should be as hydrophobic as possible in order to ensure good sliding.

Owing to its outstanding sliding properties over a very broad spectrum of different types of snow, high density polyethylene was initially used as material for the sliding coating (CH-A 601394) but has problems with respect to the mechanical strength and the resistance to wear. These problems are solved by using ultra-high molecular weight polyethylene (UHMW-PE), but coatings of UHMW-PE cannot be produced by extrusion but have to be produced by a complicated procedure, for example by pressing, sintering and subsequent peeling (CH-A 601394).

A number of proposals has been made for solving these problems and improving the sliding coatings, for example by using a crosslinked polyethylene-based polymer obtainable by extrusion (CH-A 601394) or by including water-soluble compounds in the sliding coating (CH-A 601392). A more recent development proposes a sliding coating comprising polytetrafluoroethylene (AT-B 394 951), which, however, is not very advantageous simply for cost reasons and moreover does not sufficiently solve the problems of the sliding coatings for winter sports equipment. None of these proposals have become established in practice, and modern skis and snowboards have, as a rule, a sliding coating comprising UHMW-PE, which, owing to the high crystallinity, has the highest mechanical and chemical stability of the polyethylenes. This polyethylene was originally used in medical technology for the production of hip joints and is processed in powder form like thermosetting plastics with the use of customary antistatic agents and lubricants in pressing and sintering processes.

Other polyolefins, such as polypropylene, have to date been regarded as being unsuitable for sliding coatings for winter sports equipment since they do not have advantageous sliding properties.

It is also known that the sliding properties of sliding coatings can be improved by applying a surface structure which further improves the hydrophobic properties of the coating. One difficulty, however, is that the effect of the surface structure no longer occurs when the structure is damaged, for example by slight mechanical influences in the course of use.

The slidability of skis is also improved by the use of special waxes, which is usually also required in the case of skis provided with a sliding coating. The reason for the use of waxes is firstly that they improve the hydrophobic properties of the sliding coating and secondly that polyethylene, like virtually all plastics, shows virtually no change in its surface hardness in a temperature range from about +20 to −20° C., whereas the sliding properties of the snow change as a function of temperature. Accordingly, waxes which, through a very wide range of additives, are designed for the various temperatures and types of snow are used, a harder surface being desired at lower snow temperatures and a softer surface at higher snow temperatures. In addition, waxes which, in addition to adjustment of the surface hardness, also form nanostructures which give rise to a lotus effect and hence ensure a completely unwettable surface are also obtainable. However, the use of waxes is complicated and a correct choice of a wax is difficult. In practice, it is necessary to stock a plurality of waxes in order to be able to react appropriately to different snow conditions.

There is however a demand for a better sliding coating for winter sports equipment, which sliding coating can be easily produced and has improved properties, in particular sliding properties, compared with the known, polyethylene-based coatings. In particular, there is a demand for a coating with which it is possible to achieve sliding properties which are otherwise possible only by using special waxes, so that it is possible substantially or completely to dispense with the use of waxes. The winter sports equipment should be capable of being produced economically.

According to the invention, a sliding coating for winter sports equipment is provided, which sliding coating comprises a special blend of two copolymers which are designated below as copolymer (I) and as copolymer (II). The invention also relates to winter sports equipment, in particular skis, which are equipped with such a sliding coating.

Copolymer (I) is a copolymer of propylene and at least one further olefin which comprises at least 50% of structural building blocks which originate from propylene monomers, based on the total number of structural building blocks. As a rule, however, these structural building blocks account for not more than 99% of the copolymer, based on the total number of structural building blocks. The copolymer (I) preferably comprises 70 to 99%, more preferably 75 to 98%, in particular 80 to 95%, for example about 90%, of structural building blocks which originate from propylene monomers (based in each case on the total number of structural building blocks).

The copolymer (I) moreover also contains structural building blocks which originate from at least one further olefin, preferably from ethylene. The proportion of the further olefin (of the further olefins) accounts for the remainder of the copolymer (I) (to 100% of the structural building blocks), so that the copolymer (I) is preferably a propylene/ethylene copolymer whose content of structural building blocks comprising propylene is as defined above and in which the structural building blocks originating from ethylene account in each case for the remainder of the copolymer. Instead of a pure propylene/ethylene copolymer, an ethylene/propylene-diene terpolymer (EPDM) which may also contain dienes, such as cyclooctadiene, dicyclopentadiene and/or hexadiene, in addition to propylene and ethylene can preferably also be used. It is also possible for higher olefins or dienes to be present in the copolymer. In this case, too, the proportion of structural building blocks in the copolymer (I) which originate from propylene is as described above, while the structural building blocks of the copolymer which originate from ethylene or other olefins or from the diene or dienes account for the remainder.

The copolymers (I) which are most preferred according to the invention are commercially available, for example from Exxon Mobil under the name PP 7011L1.

The copolymer (I) preferably accounts for 10 to 99% by weight, more preferably 10 to 90% by weight, in particular 50 to 90% by weight, e.g. 50 to 80% by weight or 60 to 80% by weight, e.g. about 80% by weight or about 70% by weight, of the blend of the copolymers (I) and (II).

The second substantial component in the copolymer blend is the copolymer (II), which is a copolymer of ethylene and at least one further olefin which contains at least 50% of structural building blocks which originate from ethylene (based on the total number of structural building blocks). The copolymer (II) contains, as a rule, not more than 99% of structural building blocks which originate from ethylene and in particular has 70 to 99% of structural building blocks originating from ethylene, more preferably 75 to 98%, in particular 80 to 95%, for example about 90%, based in each case on the total number of structural building blocks. The copolymer (II) moreover contains structural building blocks which originate from at least one further olefin, preferably from an olefin having 4 to 10 carbon atoms, in particular 6 to 10 carbon atoms, most preferably from octene.

According to the invention, it is likewise preferred if the copolymer (II) also contains building blocks which originate from a diene or a plurality of dienes, as are known from the EPDM rubbers. In any case, the proportion of building blocks which originate from ethylene is as defined above, while the remaining building blocks originating from further olefins or dienes account for the remainder of the copolymer (II). The preferred copolymers (II) which can be used according to the invention are commercially available, for example from Dexplatomer under the name Exact 0203 or Exact Octene-1 Plastomer.

The copolymer (II) preferably accounts for 1 to 90% by weight, more preferably 10 to 90% by weight, in particular 10 to 50% by weight, e.g. 20 to 50% by weight or 20 to 40% by weight, for example about 20% by weight or about 30% by weight, of the blend of the copolymers (I) and (II).

Preferably, both the copolymer (I) and the copolymer (II) are random copolymers. The term "copolymers" as used in the context of this description includes not only copolymers comprising two monomer units but also copolymers which are composed of more than two different monomer units, in particular of three different monomer units or four different monomer units. The term "copolymers" as used here therefore also includes in particular terpolymers. The term "olefin" as used here includes compounds having one or more double bonds, preferably having one or two double bonds (dienes), which preferably contain not more than 16, more preferably not more than 10, carbon atoms and which may be branched or straight-chain.

Advantageously, the copolymer blend for the production of the sliding coating according to the invention also contains a lubricant known per se and suitable for polypropylenes. If the lubricant is present, it is preferably present in an amount of 0.1 to 30% by weight or of 5 to 30% by weight, more preferably in an amount of 0.5 to 10% by weight or of 1 to 10% by weight, for example in an amount of about 1% by weight or of about 3% by weight, based on the total weight of the blend of copolymer (I) and copolymer (II). Particularly preferably, the lubricant is a customary hydrophobic lubricant, for example based on primary or secondary fatty acids stable at high temperatures, such as primary fatty acid amines, or is a carboxylic ester. A mixture of a lubricant based on primary fatty acids stable at high temperatures with one or more carboxylic esters is also particularly preferred. Customary commercial products are the products Hecoslip 130 PO and Hecoslip 114 PP from Hecoplast GmbH (Iserlohn, Germany). A mixture of a primary fatty acid stable at high temperatures and a carboxylic ester in a ratio of about 1:2 is particularly preferably used.

The copolymer blends for the production of the sliding coatings according to the invention may furthermore contain customary antistatic agents, in particular the antistatic additives known for polypropylene, such as carboxylic esters. Such antistatic agents, if they are present, are preferably present in an amount of 0.1 to 30% by weight or 5 to 30% by weight, more preferably of 0.5 to 10% by weight, for example in an amount of about 1% by weight, based on the total weight of the blend of copolymer (I) and copolymer (II).

Furthermore, the copolymer blends for the production of sliding coatings according to the invention may also comprise customary nucleating agents, in particular nucleating agents customary for polypropylene. Nucleating agents are nucleus formers, such as sodium benzoate, which were first introduced in the 60 s and which are obtainable, for example, from Henkel KGaA (Düsseldorf, Germany) or from Hecoplast GmbH (Iserlohn, Germany). According to the invention, organic nucleating agents, such as sugar-based nucleating agents, such as sorbitol acetals, are preferred. A referred commercial product is the product Heconuk 484PP from Hecoplast. Such nucleating agents, if they are present, are preferably present in an amount of 0.1 to 30% by weight, more preferably of 0.5 to 10% by weight, for example in an amount of about 2% by weight, based on the weight of the copolymer (I).

In a preferred embodiment of the invention, the copolymer blends for the production of the sliding coatings according to the invention contain both at least one nucleating agent as defined above and at least one lubricant as defined above, in each case in the above-mentioned preferred amounts. It is also preferred if the lubricant is partly or completely bound to the nucleating agent. If a nucleating agent is present, primary fatty acids and/or secondary fatty acids are preferably used as the lubricant, preferably in a proportion of 1 to 90% by weight, based on the total weight of the nucleating agent, more preferably in a proportion of 1 to 10% by weight, based on the total weight of the nucleating agent, in particular in a proportion of about 7% by weight, based on the total weight of the nucleating agent.

In the preferred embodiment, in which the preferred copolymer blend contains both a nucleating agent and a lubricant which is optionally or (preferably) partially bound to the nucleating agent, the lubricant used is particularly preferably a mixture of a primary fatty acid stable at high temperatures and a carboxylic ester in a ratio of about 1:10.

Further customary additives may also be present in the copolymer blend for the production of the sliding coatings according to the invention, such as additives for improving the hydrophobic and antistatic properties or the resistance to weathering and the scratch resistance, it being possible to mention in particular silicon compounds, in particular inorganic silicon compounds, such as silica, maleic anhydride, carbon black and fluorine or fluorinated hydrocarbons. Pigments, such as $TiO_2$, are optionally also present. The most suitable amounts of such additives can be readily determined by routine experiments, and each additive which is present is preferably present in an amount of 0.05 to 3% by weight, more preferably of 0.1 to 2% by weight. Copolymer blends according to the invention which contain a lubricant, a nucleating agent, a silicon compound and maleic anhydride are particularly preferred.

If the ski is intended for high-performance applications, for example racing, it is possible to apply in a customary manner special impregnations which can preferably bind to polypropylene and which improve the hydrophobic and antistatic properties in the short term and which additionally increase the surface hardness. A mixture of fluorinated isopropanol and water may be mentioned here.

It has surprisingly been found that a special blend of different copolymers as defined above can be processed by a simple extrusion process to give a sheet which is suitable in a particularly outstanding manner as a sliding coating for winter sports equipment and in particular for skis and snowboards. The coating changes its hardness in a temperature range from +20 to −20° C. so that it becomes harder with decreasing temperature, an effect which could be achieved to date only with the use of waxes.

The sliding coatings according to the invention moreover have excellent notched impact strength and strength which is comparable with that of sliding coatings based on polyethylene, at least with regard to the requirements which winter sports equipment has to meet.

The copolymer blends for the production of the sliding coating according to the invention can be processed in a customary manner. A particular advantage of the copolymer blends is that they can be formed into sliding coatings by customary extrusion processes, for example by film extrusion processes. The press sintering processes required in the case of other polymers, such as UHMW-PE, are not necessary according to the invention. The processing can, according to the invention, therefore be effected in customary single-screw and twin-screw extruders, in particular in three-zone screw extruders having a mixing section, preferably in intermeshing three-zone twin-screw extruders having a mixing section.

The extrusion dies are known to the person skilled in the art, and customary beam or coat hanger dies may be mentioned here as examples. For sizing, it is possible to use customary calender or smoothing roll units, in particular so-called chill-roll units.

It is also advantageous according to the invention to apply to the sliding coating a surface structure which results in wettability which is as low as possible. Surprisingly, it was found that, in the case of the sliding coating according to the invention to which a surface structure was applied in a customary manner, the wettability is particularly greatly reduced so that a lotus effect occurs even without the use of a wax.

A further advantage according to the invention arises from the fact that polypropylene has a so-called "memory effect" which occurs if the surface structure is applied below the molecular transition point. As a result of the memory effect, the surface structure is automatically restored if it was slightly damaged by mechanical effects.

The surface structure is applied to the sliding coating in the same way as that known in the case of skis, for example by using structured smoothing rolls. As mentioned above, it is preferable if the surface structure is applied to the sliding coating before the molecular transition point.

The sliding coating according to the invention has, as a rule, a thickness of 0.1 to 10 mm, preferably of 0.5 to 5 mm, in particular of about 1 mm.

The sliding coating according to the invention can be applied in a customary manner to winter sports equipment, in particular skis or snowboards. It is particularly preferable here to apply the sliding coating to the winter sports equipment using suitable adhesives, for example the customary hotmelt adhesives, or using a hotmelt plastic, such as, for example, a polyamide resin or an ethylene/vinyl acetate copolymer or modifications thereof. However, the sliding coating can also be bonded to the equipment in another known manner. Before the application, the winter sports equipment, in particular the ski or the snowboard, can be subjected to a customary pretreatment, such as brushing, sand-blasting, degreasing, etching or pickling, and the sliding coating can be subjected to a customary surface treatment, such as, for example, a corona treatment, flame treatment, primer treatment or ozone shower.

The following example explains the invention.

EXAMPLE

Mixture I:
8000 g of Exxon Mobil PP 7011L1, 2000 g of Dexplastomer Exact 0203, 100 g of Hecoslip 103 PO (lubricant) and 160 g of Heconuk 484 PP.

Mixture II:
8000 g of Exxon Mobil PP 7011L1, 2000 g of Dexplastomer Exact 0203, 100 g of Hecoslip 103 PO and 160 g of Heconuk 484 PP, and 100 g of Exxon Mobil Exxelor PO 1020 (maleic anhydride) and 40 g of technical-grade silicon powder ($SiO_2$).

Mixture III:
3500 g of Exxon Mobil PP 7011L1, 1500 g of Dexplastomer Exact 0203, 100 g of Hecoslip 114 PP and 50 g of Hecoslip 103 PO.

The mixtures were each mixed for 30 minutes in a customary mixer. The mixture was then extruded in a film extrusion unit comprising a three-zone single-screw extruder of the Colin brand, having a chill-roll unit with smoothing roll, to give a 1 mm thick sheet. The surface treatment was effected using a customary ski stone grinding unit of the Montana brand.

Thereafter, small sample plates (5 cm×5 cm) per mixture were ground with abrasive paper having a particle size of about 8 µm and a grinding paste having a particle size of about 100 nm, with the result that a lotus effect was imparted to the surface of the sliding coating. After the grinding residues had been washed out, an extremely low-friction sheet surface was obtained, on which water drops rolled away in spherical form.

A considerable increase in the surface hardness was found on cooling the sheet, and a decrease in the surface hardness on heating.

The sheet comprising the mixtures I and II was applied to a ski and to a snowboard by using a customary adhesive in a known manner. This winter sport equipment was then tested on wet snow, cold and dry snow and artificial snow in order to carry out a qualitative sliding test in practice. Skis and snowboards which had been equipped with the highest-quality commercially available UHMW-PE sinter coatings of the P-TEX brand served as a reference. The reference coatings were provided on the same above-mentioned stone grinding unit with the same grinding pattern as those to be tested and were prepared professionally, as is customary for use in racing, with suitable waxes for the respective snow temperature.

In comparison, the winter sports equipment with the novel coatings according to the invention appeared to be in no way inferior to the conventional equipment. On the contrary, particularly on wet snow, the mixture II appeared to be substantially superior, and the mixture I slightly superior, to the sinter coatings.

Below, the coatings according to the invention which are described above are designated as FX SmartBase, the mixture I being designated as FX SmartBase Basic and the mixture II as FX SmartBase Si type.

Quantitative analysis was effected using the following test setup, which permits an objective comparison of the sliding properties of the novel FX SmartBase coatings according to the invention with waxed reference coatings. The setup is shown in FIG. 1.

A sled having the coating to be tested as a running surface is intended to slide down a sloping plane of defined angle of inclination a and comprising snow. The sled is initially held by a magnet. When this disengages, the timing begins and the sled passes through three light barriers (L1, L2, L3).

Here, the first time t1 is recorded over the first distance x1 (5.5 cm) from the magnet to L1. The second time t2 is then recorded over the second distance x2 (50 cm) to the light barrier L2, and finally the third time t3 is recorded over the third distance x3 (50 cm) to the light barrier L3.

A CPU from Jetter, model nano b, was used for control.

The magnet was an electromagnet from IBS with 24 V input voltage. IR light barriers from IDEC, having a range of 80 cm and a reaction time of 1 ms, were chosen as light barriers.

Coating samples having an area of 80 cm$^2$ of the FX SmartBase Basic and the FX SmartBase Si type were compared on warm and cold snow with the reference coating P-Tex, which was prepared with suitable wax in relation to the respective snow conditions.

Figure 2:
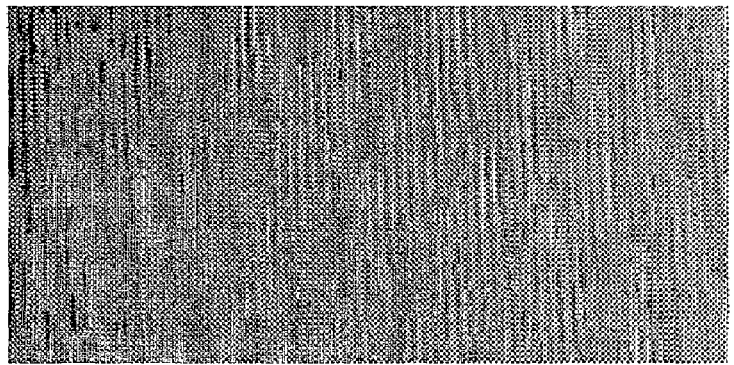

All samples were provided with the same all round structure as shown in FIG. 2 on a stone grinding machine from Montana by the Crystal Glide Finish process.

For the warm and wet snow tests, the wax Eclipse EC1 High Fluorine +80 to −3° C. from Star SkiWax was used at a snow temperature of −2° C. and an air temperature of +1.5° C.

For the cold and dry snow tests, the wax Eclipse EC2 High Fluorine 0° to −10° C. from Star Skiwax was used at a snow temperature of −6° C. and an air temperature of −4° C.

The wax was applied to the P-Tex samples using a wax iron from TOKO. The samples were then cooled at room temperature for two hours. The wax was then peeled off using a scraper from TOKO. The ground structure was then brushed out again using a structure brush from TOKO.

The FX SmartBase coatings were not waxed.

The coatings were mounted on the sled using double-sided adhesive tape and screw connections.

The sled with the mounted coating was then weighed. The weigher used was a precision weigher from Soehnle, model 8048 cyber which was accurate to a gram.

The tray, on the bottom of which lay an artificial lawn for better adhesion of the snow, was then filled with snow, over which a straight edge was drawn so that a planar surface formed. Before each run, snow was again poured onto the test piste and levelled off.

The sled was then mounted on the guide and led to the magnet without contact with the bottom.

The magnet was switched off and the measurements at the light barriers were carried out. Ten runs were carried out per coating, and the resulting times of all ten runs were averaged.

Thereafter, the averaged times were compared with one another and the average velocities were calculated.

Results:

All sleds with mounted coatings had the same weight, which was 339 g. The angle of inclination α was 15° in all tests, which corresponds to a gradient of 25.88%.

| 1. Test series with warm and wet snow (snow temperature: −2° C., air temperature: +1.5° C.) | | |
| --- | --- | --- |
| Measurement | t [sec/100] | x [cm] |
| FX SmartBase Basic | | |
| Mean value L1 | 34.6 | 5.5 |
| Mean value L2 | 95.4 | 55.5 |
| Mean value L3 | 128.8 | 105.5 |
| FX SmartBase Si type | | |
| Mean value L1 | 27.3 | 5.5 |
| Mean value L2 | 82.3 | 55.5 |
| Mean value L3 | 114.6 | 105.5 |
| P-Tex + EC1 | | |
| Mean value L1 | 40.2 | 5.5 |
| Mean value L2 | 102.4 | 55.5 |
| Mean value L3 | 137.7 | 105.5 |

Figure 3:
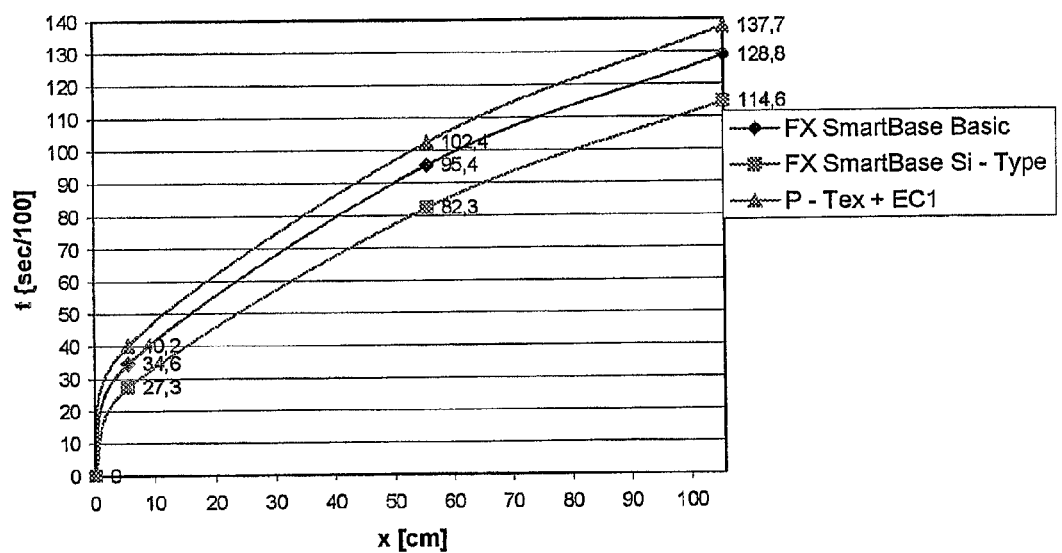

Velocity: v=x/t
where:
v: Mean velocity
x: Distance
t: Time required for x gives:
FX SmartBase Si type: v=0.9206 m/s
FX SmartBase Basic: v=0.8190 m/s
P-Tex+EC1: v=0.7661 m/s Thus, over a travel distance of 105.5 cm, the FX SmartBase Basic is 6.90% faster and the FX SmartBase Si type 20.16% faster in the case of the wet snow tested. The result is shown in FIG. 3.

| 2. Test series with cold and dry snow (snow temperature: −6° C., air temperature: −4° C.) | | |
| --- | --- | --- |
| Measurement | t [sec/100] | x [cm] |
| FX SmartBase Basic | | |
| Mean value L1 | 27.5 | 5.5 |
| Mean value L2 | 86.1 | 55.5 |
| Mean value L3 | 124.4 | 105.5 |
| FX SmartBase Si type | | |
| Mean value L1 | 27.2 | 5.5 |
| Mean value L2 | 83.6 | 55.5 |
| Mean value L3 | 119.7 | 105.5 |
| P-Tex + EC2 | | |
| Mean value L1 | 27.2 | 5.5 |
| Mean value L2 | 87.2 | 55.5 |
| Mean value L3 | 128 | 105.5 |

Figure 4:
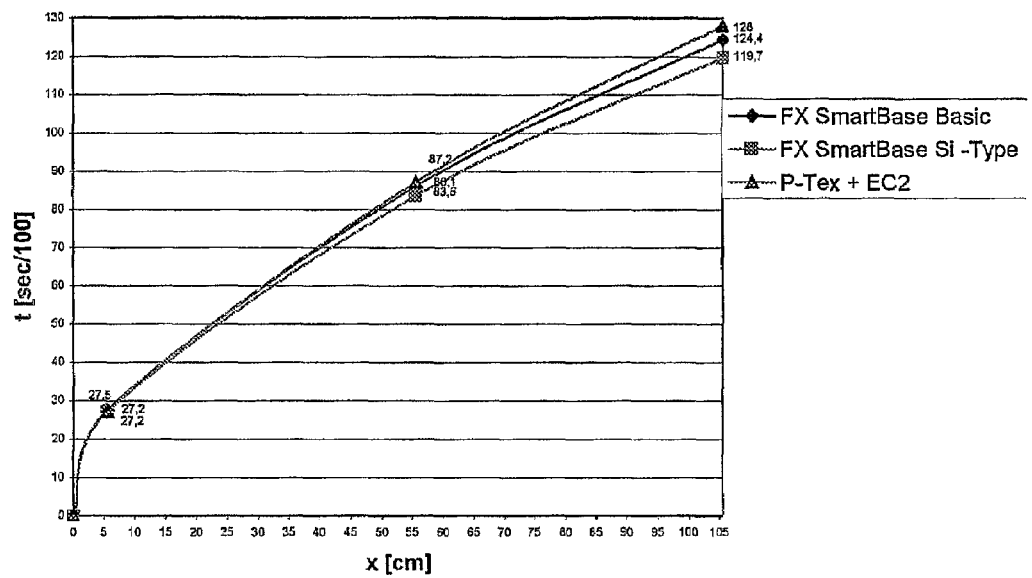

Velocity: v=x/t
where:
v: Mean velocity
x: Distance
t: Time required for x gives:
FX SmartBase Si type: v=0.8813 m/s
FX SmartBase Basic: v=0.8480 m/s
P-Tex+EC2: v=0.8242 m/s Thus, over a travel distance of 105.5 cm, the FX SmartBase Basic is 2.88% faster and the FX SmartBase Si type 6.93% faster in the case of the cold snow tested. The result is shown in FIG. 4.

The invention claimed is:

1. An article of winter sports equipment having a sliding coating adhesively bonded thereto, said sliding coating comprising a blend of a copolymer (I) and a copolymer (II), the copolymer (I) being a copolymer of propylene and at least one first olefin, wherein said copolymer (I) contains at least 50% of structural building blocks which originate from propylene monomer, based on the total number of structural building blocks, and the copolymer (II) being a copolymer of ethylene and at least one second olefin, wherein said copolymer (II) comprises 70 to 99% of structural building blocks which originate from ethylene and 1 to 30% of structural building blocks which originate from said second olefin, based on the total number of structural building blocks.

2. The article of winter sports equipment of claimed in claim 1, wherein the copolymer (I) is present in an amount of 10 to 90% by weight and the copolymer (II) in an amount of 10 to 90% by weight, based in each case on the total weight of copolymer (I) and copolymer (II).

3. The article of winter sports equipment of claim 1, wherein the blend furthermore comprises a lubricant.

4. The article of winter sports equipment of claimed in claim 3, wherein the lubricant is contained in an amount of 0.5 to 30% by weight, based on the total weight of copolymer (I) and copolymer (II).

5. The article of winter sports equipment of claimed in claim 3, wherein the lubricant is selected from the group consisting of a primary or secondary fatty acid stable at high temperatures, a carboxylic ester and mixtures thereof.

6. The article of winter sports equipment of claimed in claim 1, wherein the blend furthermore comprises a nucleating agent.

7. The article of winter sports equipment of claimed in claim 1, wherein the blend also contains one or more further additives selected from the group consisting of antistatic additives, additives for improving the hydrophobic properties, additives for improving the resistance to weathering, additives for improving the scratch resistance and pigments.

8. The article of winter sports equipment of claimed in claim 7, wherein the blend contains a silicon compound and/or maleic anhydride.

9. The article of winter sports equipment of claim 1, wherein the copolymer (I) is a propylene/ethylene copolymer comprising at least 50% of structural building blocks which originate from propylene monomer or an EPDM terpolymer comprising at least 50% of structural building blocks which originate from propylene monomer, based in each case on the total number of structural building blocks.

10. The article of winter sports equipment of claim 9, wherein the copolymer (I) is a propylene/ethylene copolymer comprising 70 to 99% of structural building blocks which originate from propylene monomers and comprising 1 to 30% of structural building blocks which originate from ethylene monomers, based in each case on the total number of structural building blocks.

11. The article of winter sports equipment of claim 1, wherein the copolymer (II) is a copolymer of ethylene and a higher olefin having 4 to 10 carbon atoms or a terpolymer of ethylene, an olefin having 4 to 10 carbon atoms and a diene.

12. The article of winter sports equipment of claim 11, wherein the olefin having 4 to 10 carbon atoms is octene.

13. The article of winter sports equipment of claim 1, which has a surface structure which was applied before the melting point.

14. A process for the production of a sliding coating for an article of winter sports equipment as claimed in claim 1, wherein the blend of copolymer (I) and copolymer (II) is extruded by a film extrusion process to give a sheet, to which optionally a surface structure is then applied before the melting point.

15. The article of winter sports equipment of claim 1, wherein said article is a ski or a snowboard.

16. The article of winter sports equipment of claim 1, wherein the copolymer (I) comprises 60 to 80% by weight of the blend and the copolymer (II) comprises 20 to 40% by weight of the blend.

17. The article of winter sports equipment of claim 1, wherein the copolymer (I) comprises 70 to 80% by weight of the blend and the copolymer (II) comprises 20 to 30% by weight of the blend.

* * * * *